(12) United States Patent
Seo et al.

(10) Patent No.: US 7,615,263 B2
(45) Date of Patent: Nov. 10, 2009

(54) METHOD OF FORMING ALIGNMENT LAYER FOR LIQUID CRYSTAL DISPLAY AND LIQUID CRYSTAL DISPLAY FABRICATED USING THE SAME

(75) Inventors: Hyun Sik Seo, Gyeonggi-do (KR); Kwang Hoon Shin, Seoul (KR)

(73) Assignee: LG Display Co., Ltd., Seoul (KR)

( * ) Notice: Subject to any disclaimer, the term of this patent is extended or adjusted under 35 U.S.C. 154(b) by 550 days.

(21) Appl. No.: 11/289,409

(22) Filed: Nov. 30, 2005

(65) Prior Publication Data
US 2006/0198969 A1 Sep. 7, 2006

(30) Foreign Application Priority Data
Mar. 7, 2005 (KR) .................. 10-2005-0018638

(51) Int. Cl.
*C09K 19/00* (2006.01)
*C09K 19/52* (2006.01)

(52) U.S. Cl. ............... 428/1.2; 428/1.1; 252/299.01; 252/299.4; 349/123; 430/20; 430/270.1

(58) Field of Classification Search ............ 428/1.1, 428/1.2; 252/299.01, 299.4; 430/20, 270.1; 349/123
See application file for complete search history.

(56) References Cited

U.S. PATENT DOCUMENTS

| 4,892,392 | A | 1/1990 | Broer .................. 350/339 |
| 5,742,370 | A | 4/1998 | Kim et al. ............ 349/124 |
| 7,252,863 | B2 * | 8/2007 | Ryu et al. ............ 427/598 |
| 2004/0209008 | A1 | 10/2004 | Liang et al. .......... 428/1.51 |
| 2006/0176431 | A1 * | 8/2006 | Kim et al. ............ 349/124 |
| 2006/0176432 | A1 * | 8/2006 | Kim et al. ............ 349/124 |

FOREIGN PATENT DOCUMENTS

| EP | 0 261 712 A1 | 3/1988 |
| EP | 1 386 910 A1 | 2/2004 |
| JP | 57-135920 A | 8/1982 |
| JP | 63129323 | 6/1988 |
| JP | 04350822 | 12/1992 |

\* cited by examiner

*Primary Examiner*—Geraldina Visconti
(74) *Attorney, Agent, or Firm*—Morgan, Lewis & Bockius LLP

(57) ABSTRACT

A method for forming an alignment layer for a liquid crystal display is disclosed. The method includes preparing a substrate and depositing an alignment layer on the substrate. The method also includes applying one of an electric field and a magnetic field to the alignment layer to set an alignment direction of the alignment layer.

22 Claims, 9 Drawing Sheets

METHOD OF FORMING ALIGNMENT LAYER FOR LIQUID CRYSTAL DISPLAY AND LIQUID CRYSTAL DISPLAY FABRICATED USING THE SAME

This application claims the benefit of Korean Patent Application No. P-2005-0018638, filed in Korea on Mar. 7, 2005, which is hereby incorporated by reference as if fully set forth herein.

BACKGROUND OF THE INVENTION

1. Field of the Invention

The present invention relates to a liquid crystal display, and more specifically to an alignment layer for initial alignment of liquid crystal in a liquid crystal display.

2. Discussion of the Related Art

Ultra-thin flat panel displays include a display screen with a thickness of not more than a few centimeters. Of these, liquid crystal displays are currently used in a wide range of applications, such as notebook computers, monitors, spacecraft, and aircraft. Liquid crystal displays have advantages of low power consumption due to low operating voltage and ease of portability.

A general liquid crystal display includes a color filter substrate having a color filter layer formed thereon, a thin film transistor substrate arranged opposite to the color filter substrate and having thin film transistors formed thereon, and a liquid crystal layer interposed between the two substrates.

The alignment direction of the liquid crystal layer in the liquid crystal display is varied depending on an applied voltage, which controls the light transmittance, thereby displaying images on a screen. To apply a voltage, electrodes are formed on the thin film transistor substrate and the color filter substrate. Specifically, pixel electrodes are arranged on the thin film transistor substrate, and a common electrode is arranged on the color filter substrate. A vertical electric field may be applied between the two substrates (in the case of a twisted nematic (TN) mode liquid crystal display), or a horizontal electric field may be applied between the pixel electrodes and the common electrode arranged on and parallel to the thin film transistor substrate (in the case of an in-plane switching (IPS) mode liquid crystal display).

FIG. 1 is an exploded perspective view of a general TN mode liquid crystal display according to the related art. As shown in FIG. 1, gate lines 12 and data lines 14 crossing each other are formed on a thin film transistor substrate 10 to form intersections. Thin film transistors T are formed at the intersections, and pixel electrodes 16 are connected to the thin film transistors T. In addition, a light-blocking film 22 is formed on a color filter substrate 20 to prevent light from leaking, an RGB color filter layer 24 is formed on the light-blocking layer 22, and a common electrode 25 is formed thereon. Thereafter, the substrates 10 and 20 are attached to each other to form one liquid crystal panel in which a liquid crystal layer is formed between the substrates 10 and 20.

When a vertical electric field is generated between the pixel electrodes 16 formed on the thin film transistor substrate 10 and the common electrode 25 formed on the color filter substrate 20, the alignment direction of a liquid crystal is controlled. If the liquid crystal layer is randomly arranged between the substrates 10 and 20, liquid crystal molecules included in the liquid crystal layer are not arranged in a fixed direction. Hence, although not shown in FIG. 1, an alignment layer for initial alignment of the liquid crystal is formed between the thin film transistor substrate 10 and the color filter substrate 20.

Formation of such an alignment layer for initial alignment of a liquid crystal has predominantly been achieved by rubbing. This rubbing method includes the steps of applying an organic polymer, such as polyimide, to a substrate to form a thin film, curing the thin organic polymer film, and rolling a rubbing roll covered with a rubbing cloth to rub the thin organic polymer film and to form an array of chains of the organic polymer in a particular direction.

With the use of the alignment layer formed with this rubbing method, liquid crystal molecules are aligned in the direction that the array of chains of the organic polymer are formed. That is, the movement direction of the rubbing roll is the same as the alignment direction of the liquid crystal molecules.

However, rubbing alignment method has the following disadvantages. First, when the arrangement of a rubbing cloth is non-uniform, light leakage may occur. FIG. 2 is a perspective view showing a state wherein the arrangement of a rubbing cloth is non-uniform.

As described above, structures, such as thin film transistors, color filter layers and electrode layers, are formed on a substrate. As shown in FIG. 2, when a rubbing roll 30 is rolled on the structures formed on a substrate 10 or 20, parts 32a of a rubbing cloth 32 covering the rubbing roll 30 may be non-uniformly arranged. This non-uniform arrangement of the rubbing cloth 32 causes a non-uniform array of chains of an organic polymer in regions of the substrate rubbed by the parts 32a of the rubbing cloth. As a result, the alignment of the liquid crystal is not uniform, thus causing light leakage.

Second, when a rubbing cloth does not come into contact with a substrate, light leakage may occur. FIG. 3 is a perspective view showing the arrangement state of a liquid crystal in the case where a rubbing cloth does not come into contact with a substrate.

As discussed above, electrode layers, such as pixel electrodes and a common electrode, are formed on a substrate. Due to a step height in electrode layers formed on a substrate 10, as shown in FIG. 3, a region (region "A") is formed where a rubbing cloth 32 does not come into contact with the substrate 10. In this case, the alignment of a liquid crystal is not uniform in the region A, resulting in light leakage.

In conclusion, according to a related art rubbing alignment method, when the arrangement of a rubbing cloth is non-uniform or a rubbing cloth does not come into contact with a substrate, rubbing cannot be performed well, causing the problem of light leakage. The above-mentioned problems of the related art rubbing alignment method are attributed to a physical contact between a rubbing roll and a substrate. Thus, there exists a need for a novel liquid crystal alignment layer forming method to solve the problems of the related art rubbing alignment method.

SUMMARY OF THE INVENTION

Accordingly, the present invention is directed to a method for forming an alignment layer for a liquid crystal display and a liquid crystal display fabricated using the method that substantially obviate one or more problems due to limitations and disadvantages of the related art.

An object of the present invention is to provide a method for forming an alignment layer without causing light leakage problems associated with the related art rubbing alignment method.

Another object of the present invention is to provide a liquid crystal display fabricated using the method for forming an alignment layer without causing light leakage problems associated with the related art rubbing alignment method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for forming an alignment layer for a liquid crystal display includes the steps of: preparing a substrate; depositing an alignment layer on the substrate; and applying one of an electric field and a magnetic field to the alignment layer to set an alignment direction of the alignment layer.

In another aspect of the present invention, a liquid crystal display includes: lower and upper substrates; a liquid crystal layer interposed between the lower and upper substrates; and an alignment layer formed on at least one of the lower and upper substrates and including a first compound represented by

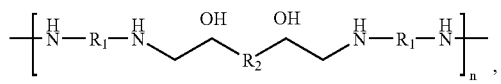

wherein n is an integer.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
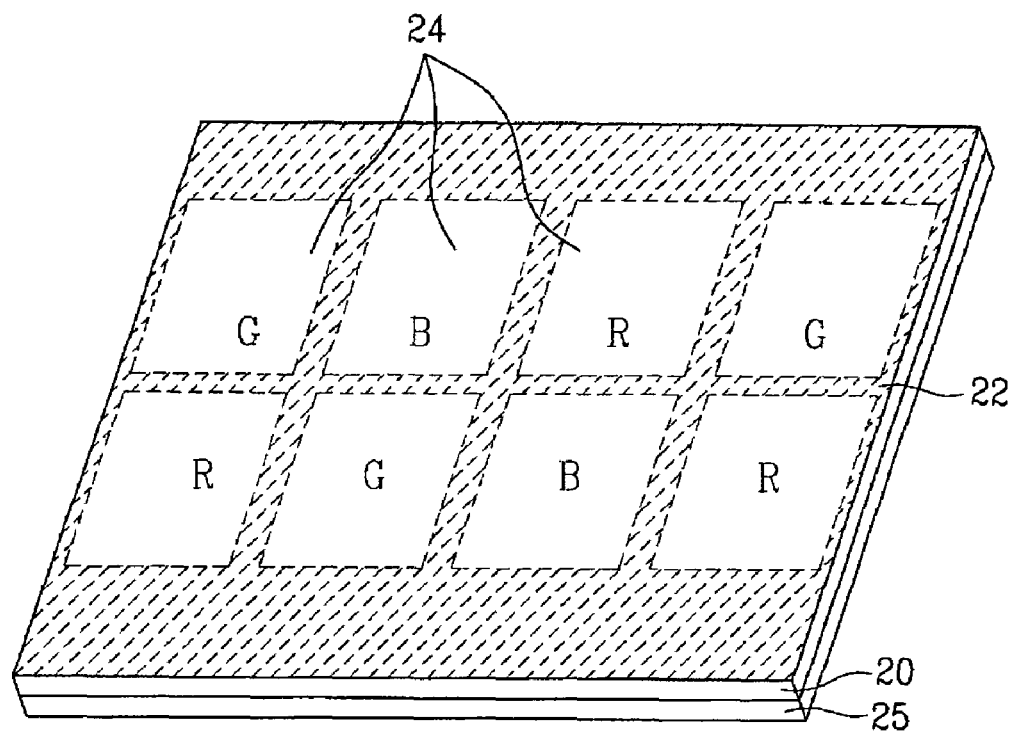
FIG. 1 is an exploded perspective view of a general liquid crystal display.
Figure 1:
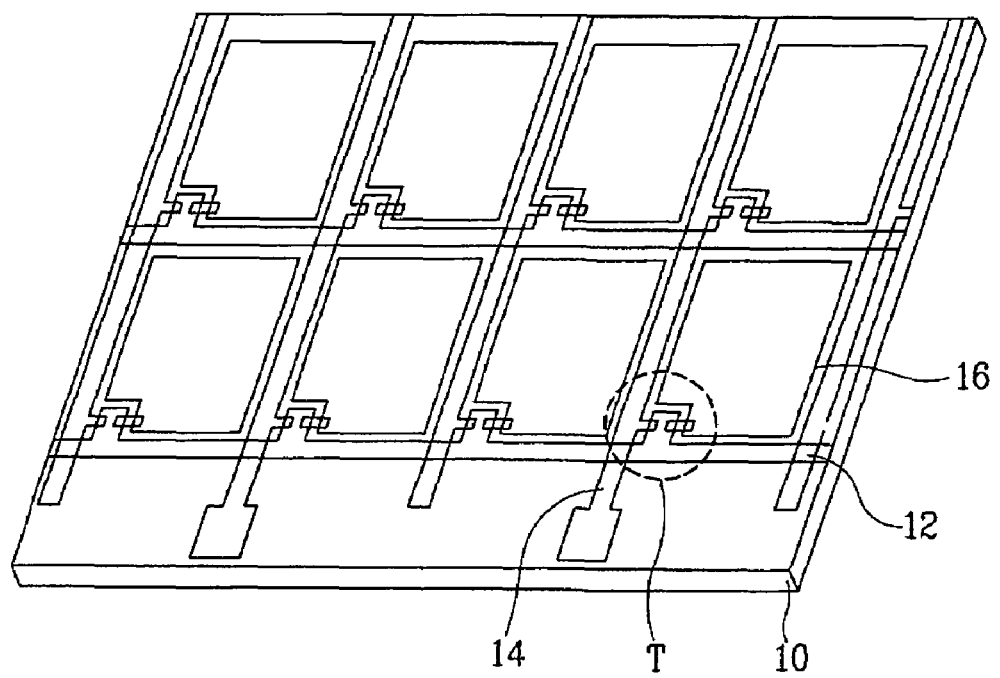
Figure 2:
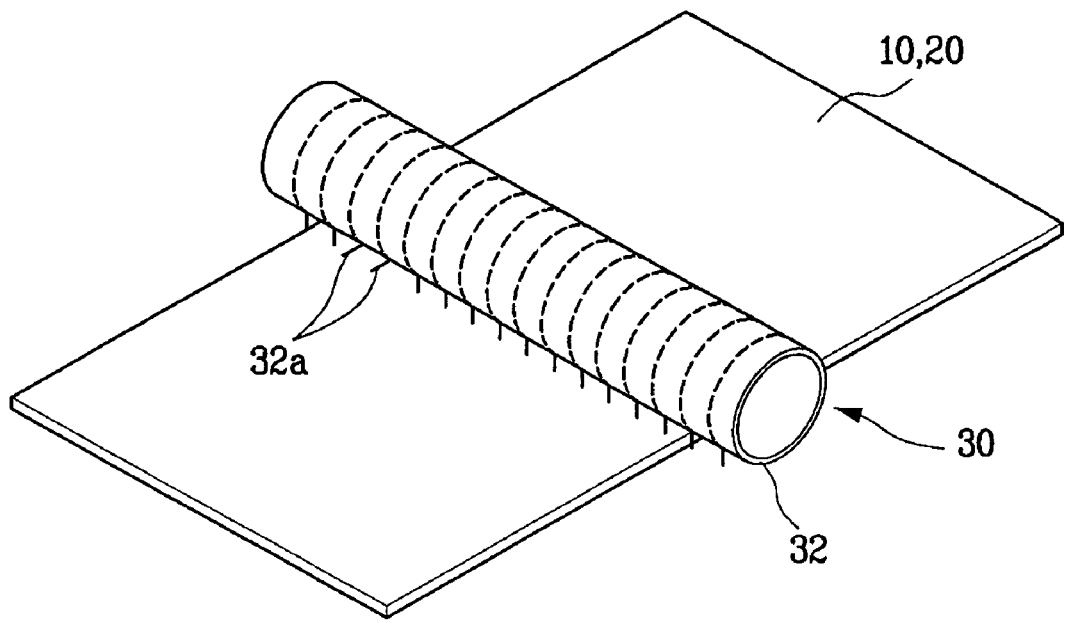
FIGS. 2 and 3 are diagrams illustrating the problems of a related art rubbing alignment method.
Figure 3:
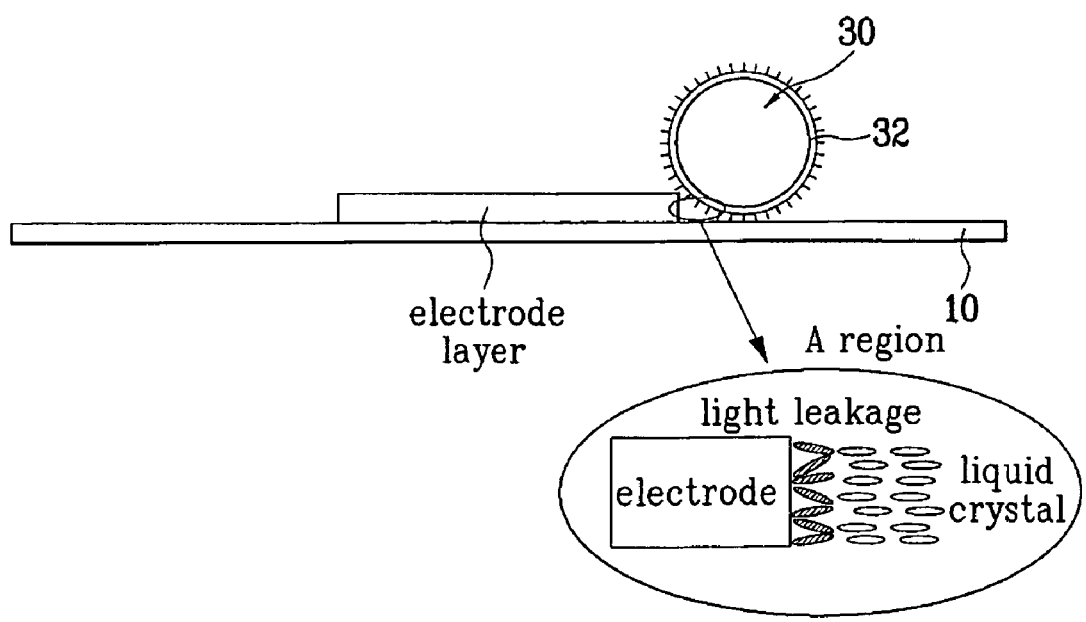
Figure 4A:
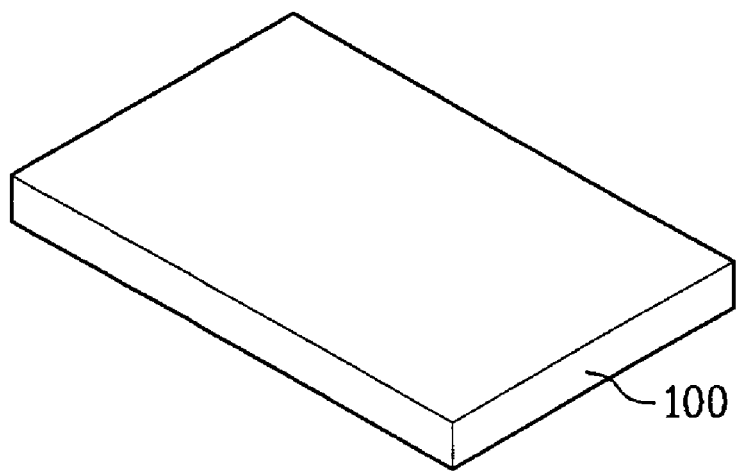
FIGS. 4A to 4C are process diagrams showing the procedure of a method for forming an alignment layer for a liquid crystal display according to a first exemplary embodiment of the present invention.
Figure 4B:
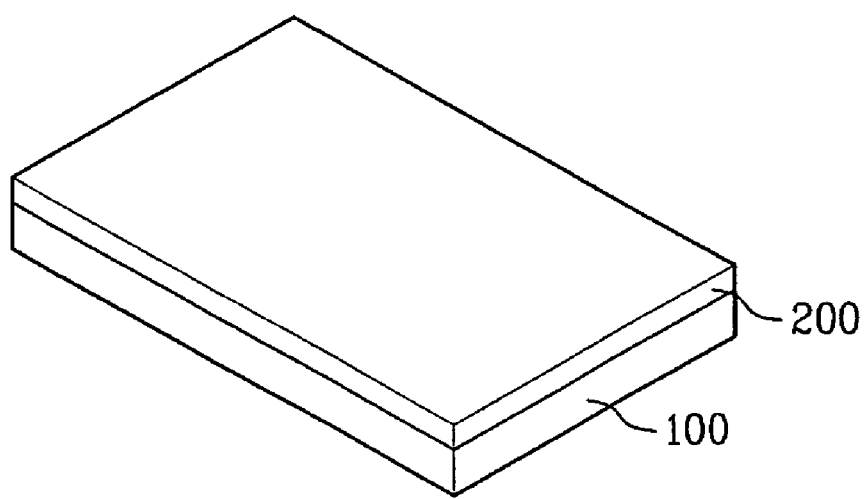
Figure 4C:
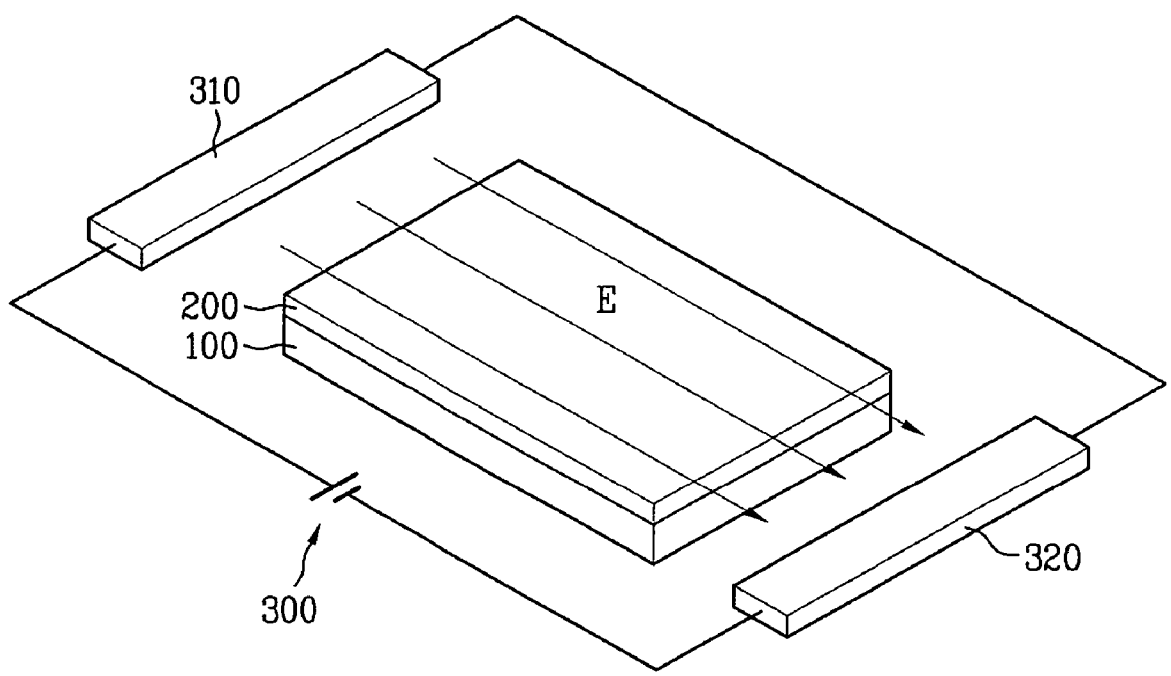

FIGS. 4A to 4C are process diagrams showing the procedure of a method for forming an alignment layer for a liquid crystal display by application of an electric field according to a first exemplary embodiment of the present invention. First, as shown in FIG. 4A, a substrate 100 is prepared. The substrate 100, as one substrate for a liquid crystal display, may be a thin film transistor substrate having thin film transistors formed thereon or a color filter substrate having color filters formed thereon. Even in the case where the substrate 100 is a thin film transistor substrate or a color filter substrate, constituent elements that can be formed on the substrate 100 may vary depending on the mode of liquid crystal displays, e.g., the TN mode or the IPS mode.

For example, in the case where the substrate 100 is a thin film transistor substrate for a TN (twisted nematic) mode liquid crystal display, gate lines and data lines crossing each other on a transparent substrate are formed so as to define pixel regions. Thin film transistors including a gate electrode, a source electrode and a drain electrode are formed at the intersections formed between the gate lines and the data lines. Pixel electrodes are formed within the pixel regions to connect to the drain electrode of the thin film transistors.

In the case where the substrate 100 is a thin film transistor substrate for an in-plane switching (IPS) mode liquid crystal display, gate lines and data lines crossing each other on a transparent substrate are formed so as to define pixel regions. Thin film transistors including a gate electrode, a source electrode and a drain electrode are formed at the intersections formed between the gate lines and the data lines. Pixel electrodes are formed within the pixel regions to connect to the drain electrode of the thin film transistors, and a common electrode is formed parallel to the pixel electrodes.

Further, in the case where the substrate 100 is a color filter substrate for a TN mode liquid crystal display, a light-blocking layer is formed on a transparent substrate to prevent light from leaking. A green/red/blue (RGB) color filter layer is formed on the light-blocking layer. A common electrode is formed on top of the color filter layer.

In the case where the substrate 100 is a color filter substrate for an IPS mode liquid crystal display, a light-blocking layer is formed on a transparent substrate to prevent light from leaking. A green/red/blue (RGB) color filter layer is formed on the light-blocking layer. An overcoat layer is formed on top of the color filter layer to planarize the substrate.

Modifications and variations of the materials and formation methods of the constituent elements formed on the substrate 100 will be obvious to those skilled in the art. In addition to a glass substrate or a plastic substrate, a flexible substrate can also be used as the transparent substrate. Since a physical contact occurs between a rubbing roll and a substrate in related art rubbing alignment methods, the use of flexible substrates causes problems. In contrast, as described below in detail, since the method according to the present invention uses an electric field, no physical contact is made. Accordingly, unlike with the related art rubbing method, flexible substrates do not cause any problems when the method according to the present invention is applied.

Then, as shown in FIG. 4A, an alignment layer 200 is applied to the substrate. The alignment layer 200 contains a compound represented by Formula 1 below, where n is an integer:

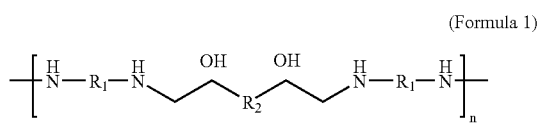
(Formula 1)

The compound of Formula 1 may be prepared by reaction of a diamine of Formula 2 below:

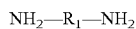 (Formula 2)

with a diepoxy of Formula 3 below:

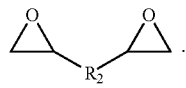 (Formula 3)

$R_1$ in Formula 1 may be an alkyl group or a compound containing a benzene ring. The compound containing a benzene ring may be a compound selected from the group consisting of

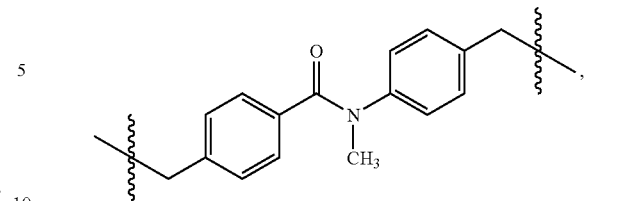,

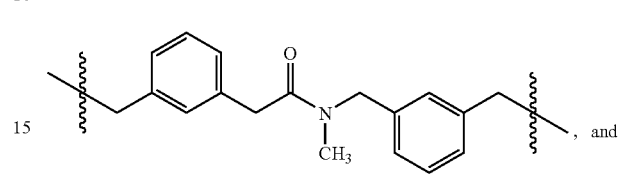, and

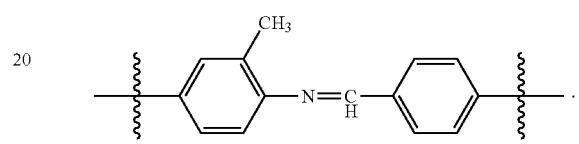.

The compound containing a benzene ring and an ether group may be a compound selected from the group consisting of

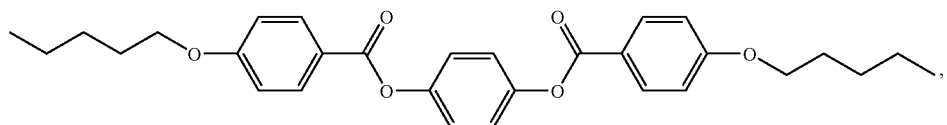,

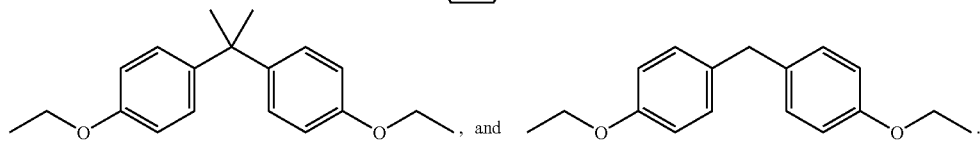.

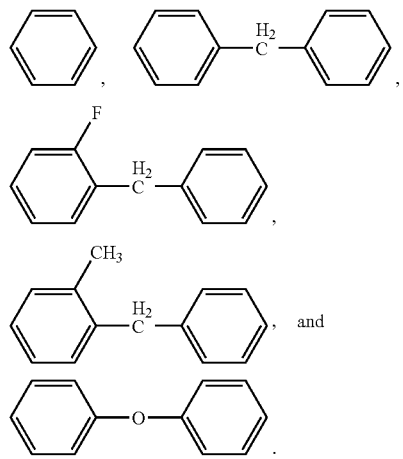

In addition, $R_2$ in Formula 1 may be a compound containing an amine or a compound containing a benzene ring and an ether group. The compound containing an amine may be a compound selected from the group consisting of Then, as shown in FIG. 4C, an electric field E is applied to the alignment layer 200 using an electric field generator 300 to determine the alignment direction of the alignment layer 200. The electric field generator 300 includes an anode 310 and a cathode 320. The substrate 100 applied with the alignment layer 200 is placed between the anode 310 and a cathode 320. The electric field E is applied from the anode 310 to the cathode 320 as indicated by the arrows. Although the anode 310 and the cathode 320 do not come into contact with the substrate 100 in FIG. 4C, the anode 310 and the cathode 320 may come into contact with the sides of the substrate 100 in view of the intensity of the electric field applied.

When an electric field is applied to an alignment layer containing the compound of Formula 1, the alignment direction of the alignment layer 200 is set to be the same as the direction of the electric field applied. Hence, it is preferred that the electric field be applied in the direction identical to the alignment direction of the alignment layer 200.

Figure 5A:
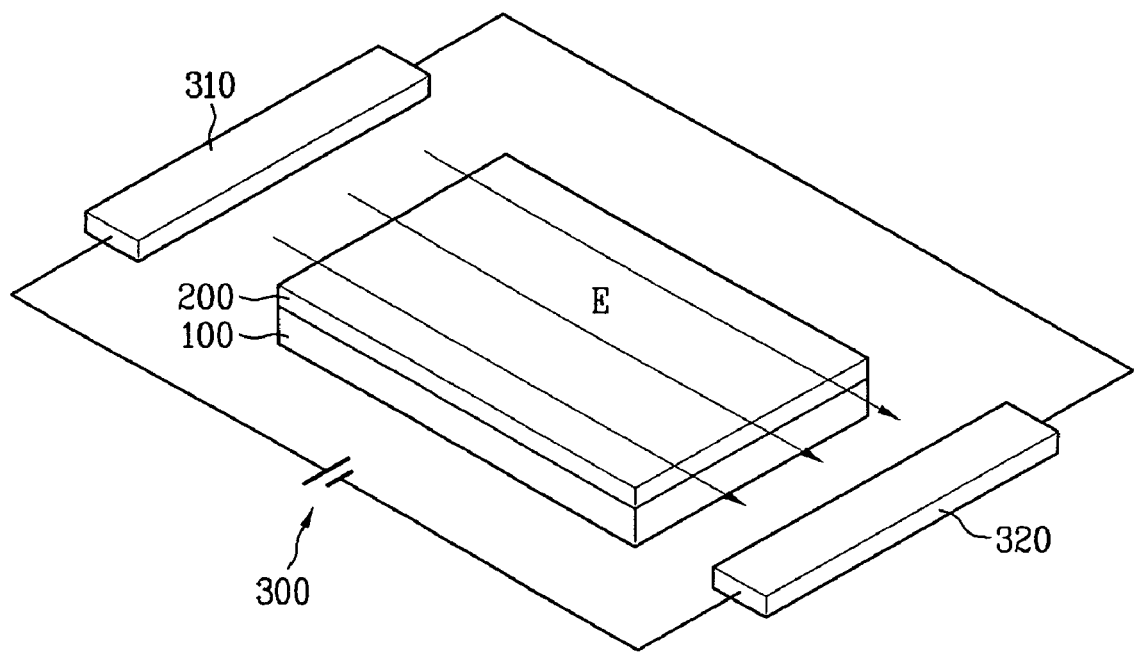
FIGS. 5A to 5C are diagrams schematically showing various states wherein an electric field is applied in accordance with the first exemplary embodiment of the present invention.
Figure 5B:
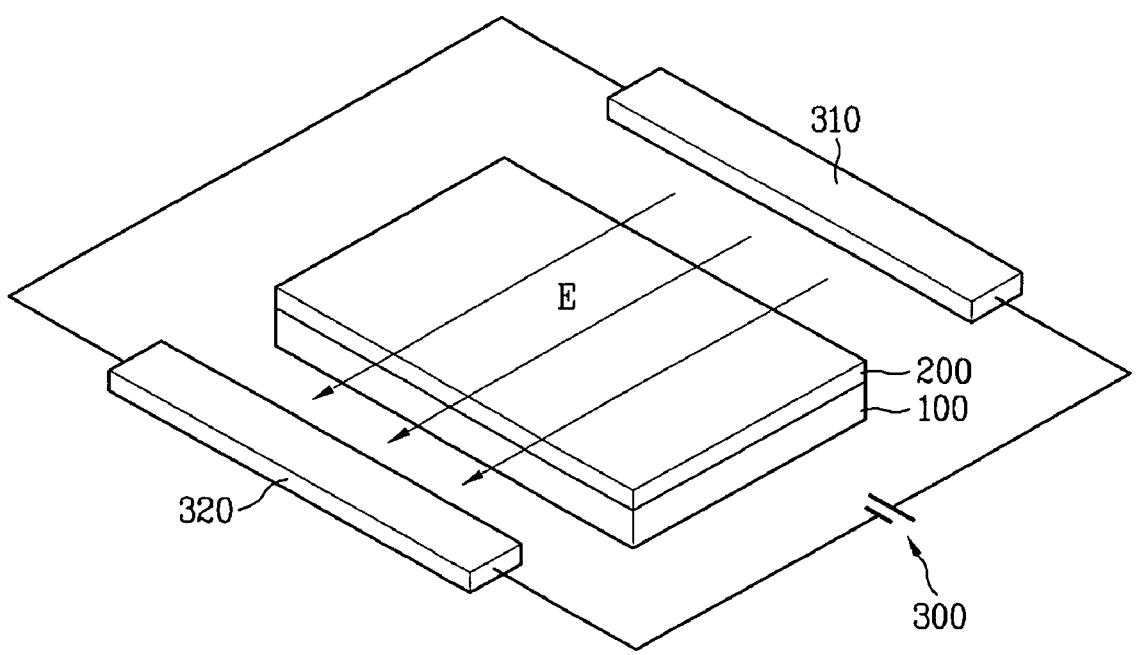
Figure 5C:
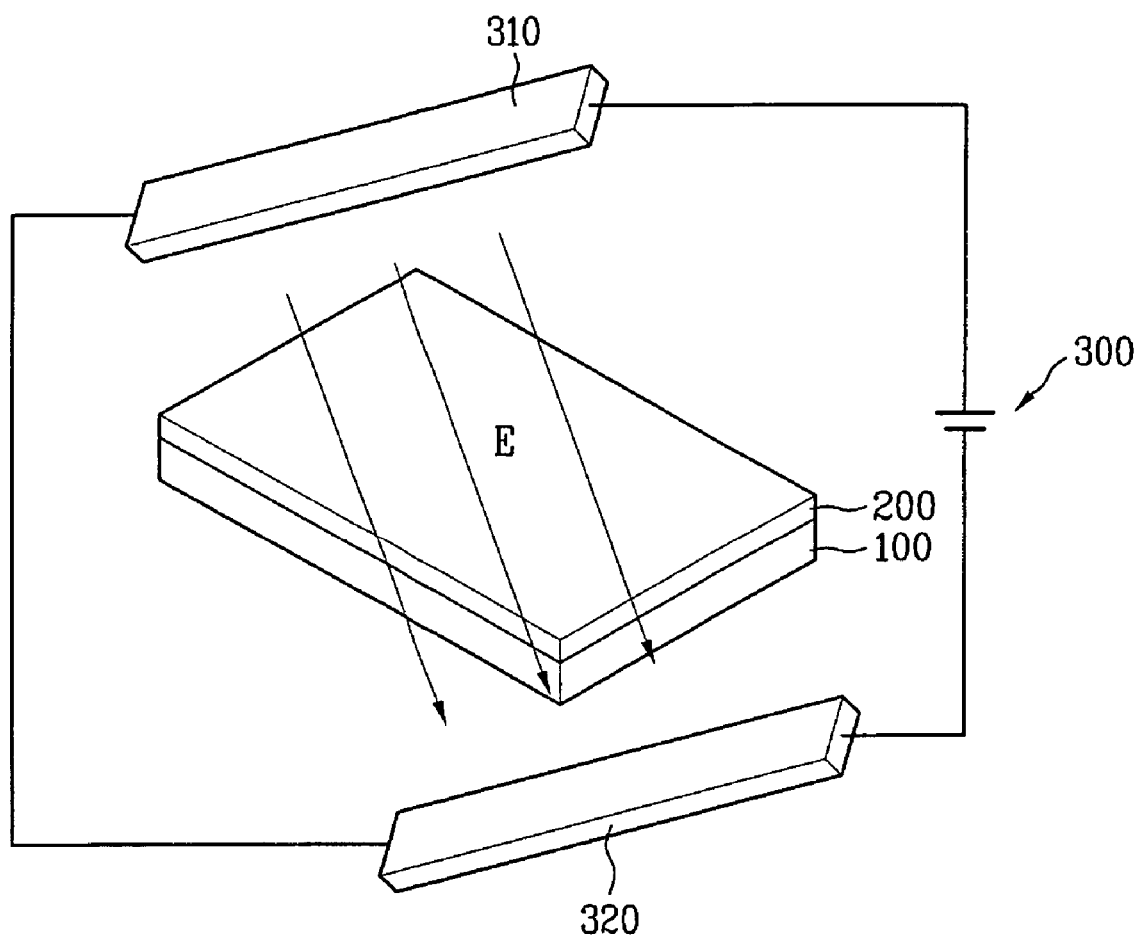

Accordingly, where it is desired to align the alignment layer 200 in the direction parallel to the x axis, an electric field is preferably applied in the direction parallel to the x axis, as shown in FIG. 5A. Where it is desired to align the alignment layer 200 in the direction perpendicular to the x axis, an electric field is preferably applied in the direction perpendicular to the x axis, as shown in FIG. 5B. Where it is desired to align the alignment layer 200 in the direction diagonal to the x axis, an electric field is preferably applied in the direction diagonal to the x axis, as shown in FIG. 5C. To vary the direction of the electric field applied, as shown in FIGS. 5A to 5C, the electric field generator 300 or the substrate 100 may be rotated.

The step of applying the alignment layer 200 shown in FIG. 4B and the step of applying an electric field to the alignment layer 200 shown in FIG. 4C are preferably carried out in a consecutive manner to shorten the processing time. Although not shown in the figures, the method of the present invention may further comprise the step of curing the alignment layer after the step of applying an electric or magnetic field. The curing step may be carried out by heating the alignment layer using a heater.

Figure 6A:
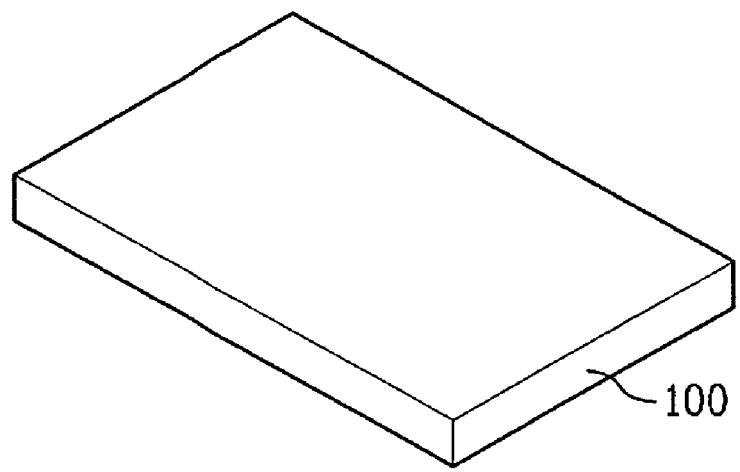
FIGS. 6A to 6C are process diagrams showing the procedure of a method for forming an alignment layer for a liquid crystal display according to a second exemplary embodiment of the present invention.
Figure 6B:
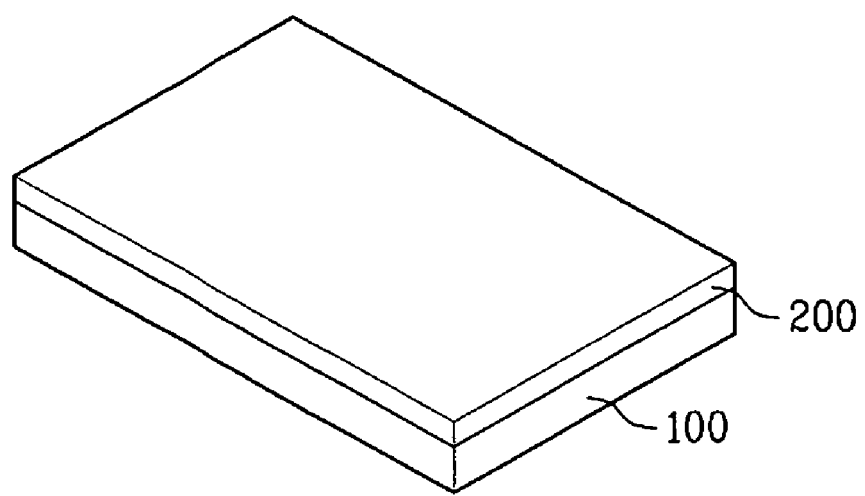
Figure 6C:
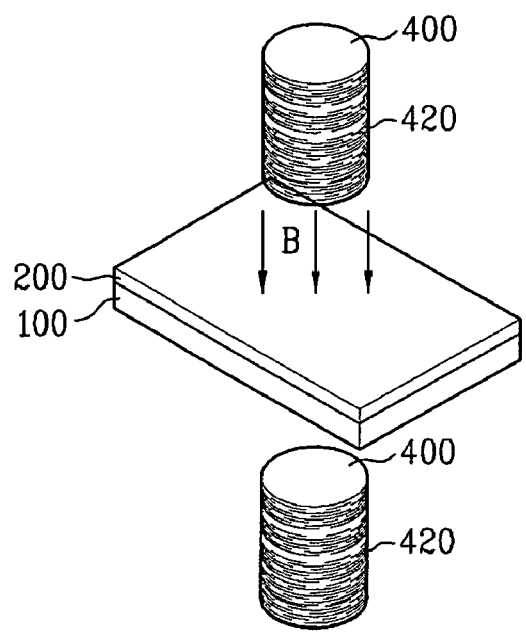
Figure 6C:
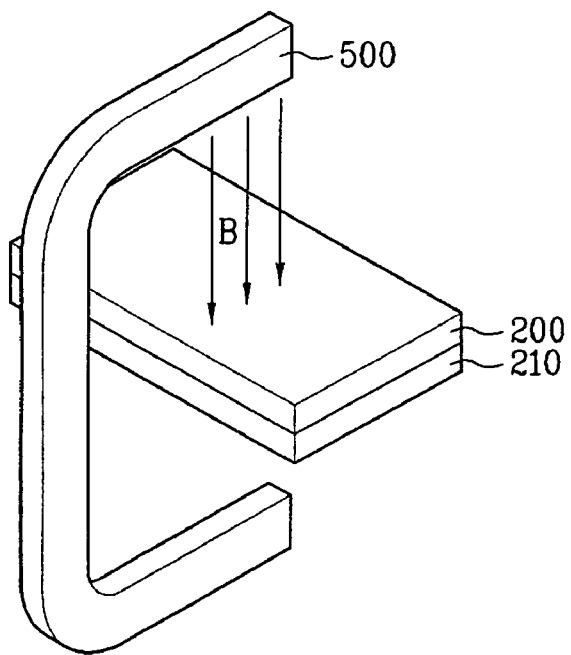

FIGS. 6A to 6C are process diagrams illustrating the procedure of a method for forming an alignment layer for a liquid crystal display by application of a magnetic field according to a second exemplary embodiment of the present invention. First, as shown in FIG. 6A, a substrate 100 is prepared. Constituent elements that can be formed on the substrate 100 may vary depending on the mode of liquid crystal displays, as discussed above in connection with the first exemplary embodiment. In addition to a glass substrate or a plastic substrate, a transparent substrate, such as a flexible substrate, can be used with the method of the present invention.

Then, as shown in FIG. 6B, an alignment layer 200 is applied to the substrate. The kinds of the alignment layer 200 that may be used are the same as those described above in detail in connection with the first exemplary embodiment, e.g., the compound of Formula 1.

Then, as shown in FIG. 6C, a magnetic field B is applied to the alignment layer 200 using a magnetic field generator 400 or 500 to determine the alignment direction of the alignment layer 200. The magnetic field B can be applied using an electromagnet system in which a pair of electromagnets 400 wound with coils 420 are arranged to face each other through the substrate as shown in FIG. 6C, or a horseshoe magnet surrounding the substrate as shown in FIG. 6C. The present invention is not limited thereto, and other magnet or electromagnet arrangements may be used to apply a magnetic field to the substrate 100 with the alignment layer 200.

Since it may be preferable to have the electrodes come into contact with the substrate when the electric field is applied in the first exemplary embodiment, the step of bringing the electrodes into contact with the substrate may additionally be required. In contrast, no contact with the substrate is required when the magnetic field is applied in the second exemplary embodiment. Thus, the application of the magnetic field may result in a higher productivity than that of the electric field due to a shortened processing time.

When a magnetic field is applied to an alignment layer containing the compound of Formula 1, the alignment direction of the alignment layer 200 is set perpendicular to the direction of the magnetic field applied. Thus, it is preferred that the magnetic field be applied in the direction perpendicular to the alignment direction of the alignment layer 200. To vary the direction of the magnetic field applied, the magnetic field generator 400 or 500, or the substrate 100 may be rotated. Also, the step of applying the alignment layer 200 shown in FIG. 6B and the step of applying a magnetic field to the alignment layer 200 shown in FIG. 6C may be carried out in a consecutive manner to shorten the processing time.

Figure 7:
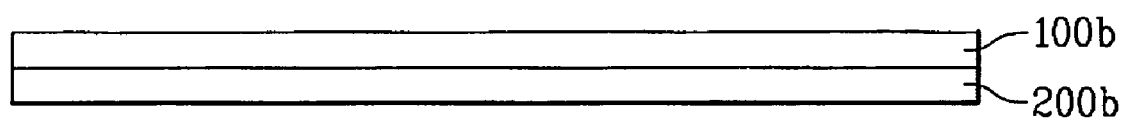
FIG. 7 is a schematic view of a liquid crystal display according to a third exemplary embodiment of the present invention.
Figure 7:
Figure 7:
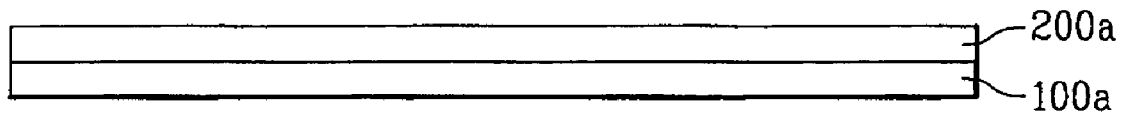

FIG. 7 is a cross-section view showing the structure of a liquid crystal display according to the third exemplary embodiment of the present invention. As shown in FIG. 7, a liquid crystal display of the present invention includes a lower and upper substrates 100a and 100b, alignment layers 200a and 200b formed on the two substrates 100a and 100b, respectively, and a liquid crystal layer 600 interposed between the two substrates 100a and 100b. The alignment layers 200a and 200b may contain a compound represented by Formula 1 below wherein n is an integer:

(Formula 1)

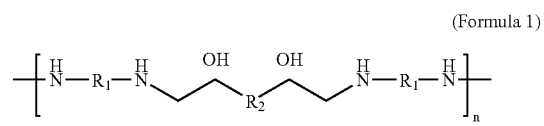

Although the alignment layers 200a and 200b are formed on the two substrates 100a and 100b, respectively, in FIG. 7, one alignment layer can be formed on only one of the substrates 100a and 100b. Also, as explained above, the structure of the lower and upper substrates can be properly varied depending on the mode, e.g., TN mode or IPS mode, of the liquid crystal display.

The compound of Formula 1 is as defined above in detail. Also, as detailed above, according to the present invention, since the alignment direction of an alignment layer is determined by using an electric or magnetic field, no physical contact between a rubbing roll and the substrate is required. Thus, the problem of light leakage associated with the rubbing alignment method can be prevented. In addition, since no physical contact with a rubbing roll is required, plastic substrates as well as flexible substrates can be used in the present invention.

Furthermore, since the steps of applying an alignment layer and applying electric or magnetic field to the alignment layer can be carried out in a consecutive manner, the processing time is shortened. Also, since the direction of the electric or magnetic field used in the present invention can be rotated, e.g., by rotating the electric or magnetic field generator or by rotating the substrate, the alignment direction of an alignment layer can be easily varied as desired.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A method for forming an alignment layer for a liquid crystal display, comprising the steps of:
   preparing a substrate;
   depositing an alignment layer on the substrate; and
   applying an electric field or a magnetic field to the alignment layer to set an alignment direction of the alignment layer,
   wherein the alignment layer includes a first compound represented by

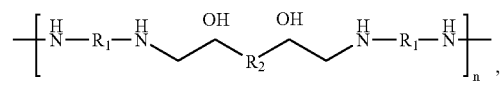

wherein n is an integer,
wherein $R_1$ includes one of an alkyl group and a second compound having a benzene ring, wherein R$_2$ includes one of a third compound having an amine and a fourth compound having a benzene ring and an ether group, and wherein the electric field is applied in the same direction as the alignment direction of the alignment layer or wherein the magnetic field is applied in a direction perpendicular to the alignment direction of the alignment layer.

2. The method according to claim 1, wherein the first compound is prepared by reaction of a diamine of NH$_2$—R$_1$—NH$_2$ with a diepoxy of

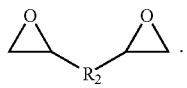.

3. The method according to claim 1, wherein the second compound includes one of

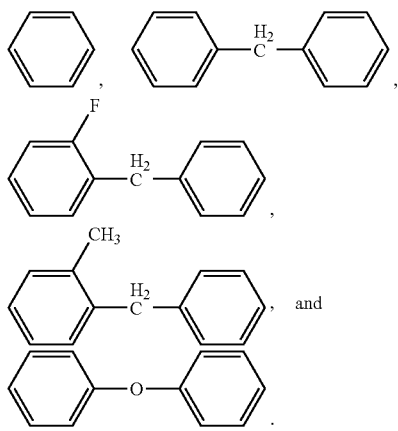

4. The method according to claim 1, wherein the third compound includes one of

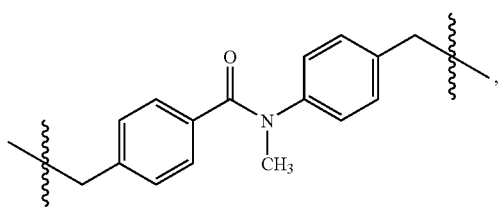

-continued

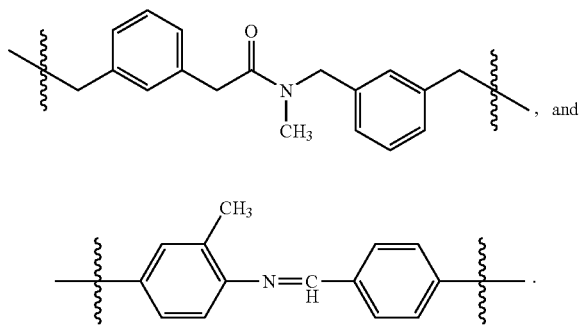

5. The method according to claim 1, wherein the fourth compound includes one of

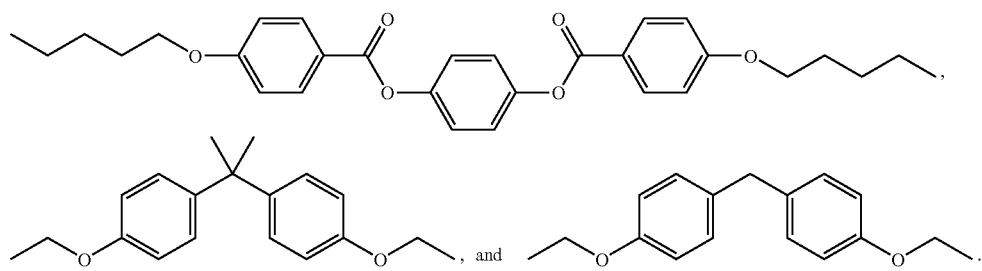

6. The method according to claim 1, wherein the applying of the magnetic field includes using an electromagnet system.

7. The method according to claim 1, wherein the applying of the magnetic field includes using a horseshoe magnet.

8. The method according to claim 1, wherein the step of applying includes the step of varying a direction of one of the electric and magnetic fields based on the alignment direction of the alignment layer to be set.

9. The method according to claim 8, wherein the step of varying includes rotating the one of an electric field generator and a magnetic field generator while the substrate having the alignment layer deposited thereon is stationary.

10. The method according to claim 8, wherein the step of varying includes rotating the substrate with the alignment layer deposited thereon while the one of an electric field generator and a magnetic field generator is stationary.

11. The method according to claim 1, wherein the depositing and applying steps are performed in a consecutive manner.

12. The method according to claim 1, further comprising the step of curing the alignment layer after the applying step.

13. The method according to claim 1, wherein the step of preparing the substrate includes the steps of forming gate lines and data lines crossing each other on a transparent substrate to define pixel regions, forming thin film transistors including a gate electrode, a source electrode and a drain electrode at intersections formed between the gate lines and the data lines, and forming pixel electrodes connected to the drain electrodes of the thin film transistors.

14. The method according to claim 1, wherein the step of preparing the substrate includes the steps of forming gate lines and data lines crossing each other on a transparent substrate to define pixel regions, forming thin film transistors, including a gate electrode, a source electrode and a drain electrode at intersections formed between the gate lines and the data lines, forming pixel electrodes connected to the drain electrodes of the thin film transistors, and forming a common electrode parallel to the pixel electrodes.

15. The method according to claim 1, wherein the step of preparing the substrate includes the steps of forming a light-blocking layer on a transparent substrate to prevent light from leaking, forming a green/red/blue color filter layer on the light-blocking layer, and forming a common electrode on top of the color filter layer.

16. The method according to claim 1, wherein the step of preparing the substrate includes the steps of forming a light-blocking layer on a transparent substrate to prevent light from leaking, forming a green/red/blue color filter layer on the light-blocking layer, and forming an overcoat layer on top of the color filter layer.

17. The method according to claim 1, wherein the substrate is one of a plastic substrate and a flexible substrate.

18. A liquid crystal display, comprising:
lower and upper substrates;
a liquid crystal layer interposed between the lower and upper substrates; and
an alignment layer formed on at least one of the lower and upper substrates and including a first compound represented by

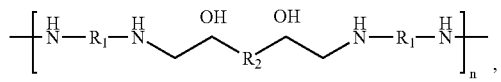

wherein n is an integer,
wherein $R_1$ includes one of an alkyl group and a second compound having a benzene ring,
wherein $R_2$ includes one of a third compound having an amine and a fourth compound having a benzene ring and an ether group, and
wherein an alignment direction of the alignment layer is set in the same direction as a direction of an electric field or in a direction perpendicular to magnetic field applied to set the alignment direction of the alignment layer.

19. The liquid crystal display according to claim 18, wherein the first compound is prepared by reaction of a diamine $NH_2$—$R_1$—$NH_2$ with a diepoxy of

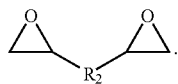

20. The liquid crystal display according to claim 18, wherein the second compound includes one of

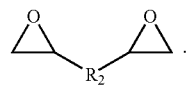

21. The liquid crystal display according to claim 18, wherein the third compound includes one of

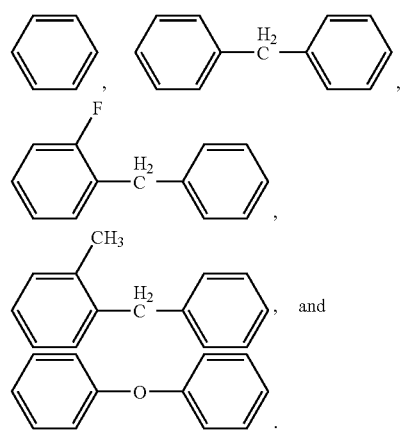

22. The liquid crystal display according to claim 18, wherein the fourth compound includes one of

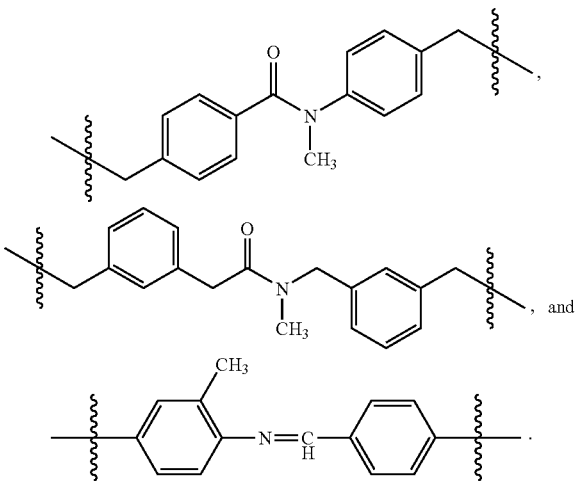

* * * * *